UNITED STATES PATENT OFFICE.

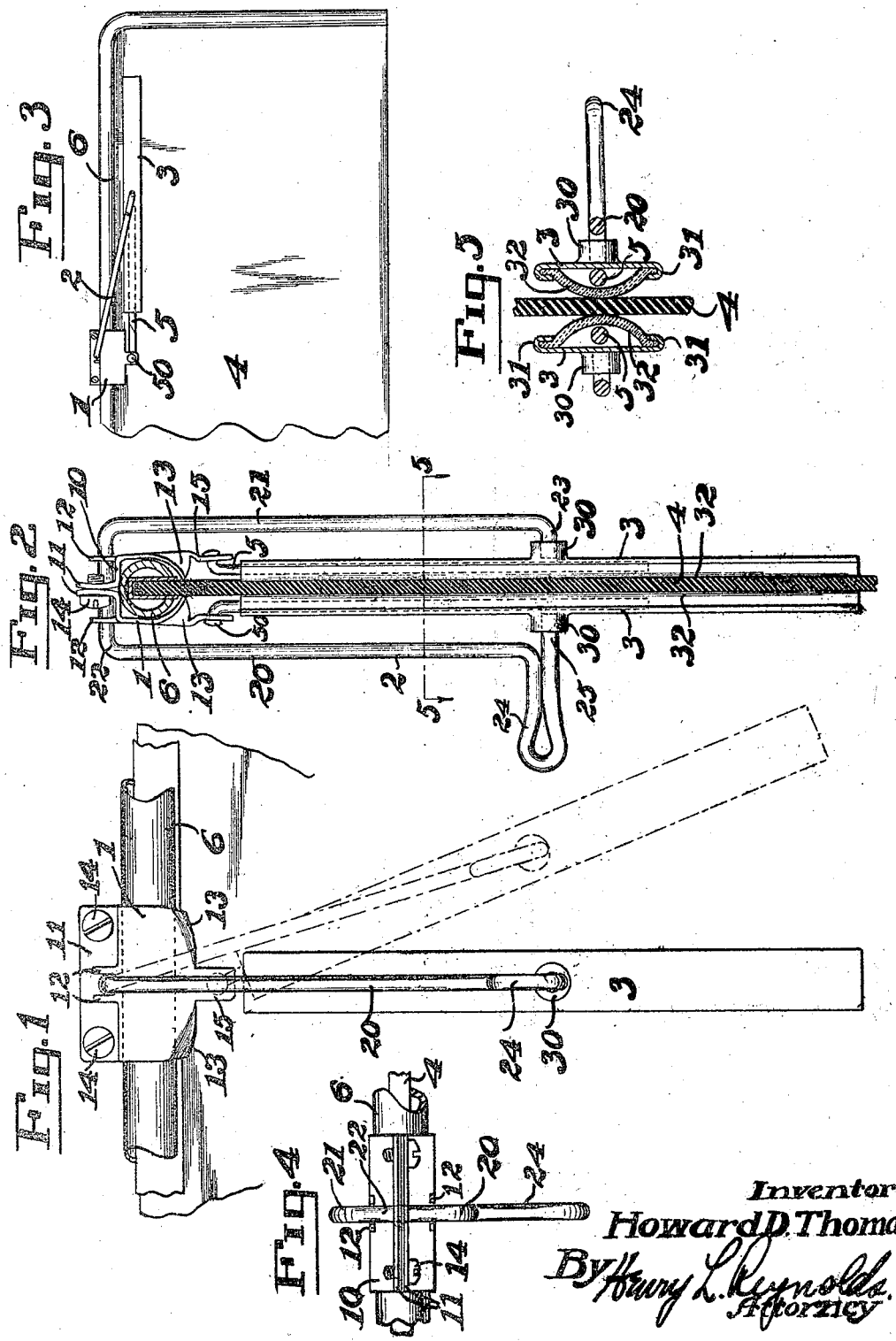

HOWARD D. THOMAS, OF SEATTLE, WASHINGTON.

WIND-SHIELD CLEANER.

1,276,283.  Specification of Letters Patent.  Patented Aug. 20, 1918.

Application filed November 23, 1916. Serial No. 133,087.

*To all whom it may concern:*

Be it known that I, HOWARD D. THOMAS, a citizen of the United States, and resident of the city of Seattle, county of King, and State of Washington, have invented certain new and useful Improvements in Wind-Shield Cleaners, of which the following is a specification.

My invention relates to wind shield cleaners and consists of a device which is designed for attachment to the wind shield of automobiles for the purpose of making it easy to clean the same of rain drops, whereby vision of the driver will not be interfered with during rainy weather.

It has been one object of my invention to provide a device of this sort which may be readily and securely attached to and removed from a wind shield and which is of such character and construction that its presence upon the wind shield will not be objectionable.

It is also intended that it shall be readily removable in fair weather and attachable in rainy weather, so that when weather conditions do not require it, it may be removed, if this be desired.

The novel features of my invention will be hereinafter described and then particularly pointed out in the claim.

In the accompanying drawings I have shown my device in the form of construction which is now most preferred by me.

Figure 1 is a face view of the device as seen from the inner or rear side of the wind shield.

Fig. 2 is a vertical section through the wind shield, showing the device applied thereto.

Fig. 3 is a rear view of the device showing the cleaner bars in raised position.

Fig. 4 is a view of the device as seen from above.

Fig. 5 is a section taken upon the line 5—5 of Fig. 2.

As a pivot basis or frame by which the device may be secured to the wind shield, I employ two plates 1, these being bent to form top flanges 10, and upwardly extending flanges 11, these plates being adapted to be brought together in such manner that the side sections 1 lie at each side of the bar 6, which forms the upper marginal bar of the frame of the wind shield. The upwardly extending flanges 11 are secured together by two screws or bolts 14, or in any other suitable manner. The lower corners 13 of the side sections 1 are preferably bent inward somewhat, as indicated in Figs. 1 and 2, so as to curve under the frame bar 6. Centrally, each of the side sections 1 has a depending ear 15, which is perforated to receive the bent end 50 of the guide rods 5.

The top section 10 of the pivot base, or frame, has ears cut therefrom and extending upwardly to form the retaining fingers 12. Between these fingers and passing through holes formed in the central flanges 11, is the central section 22 of an operating arm 2. This operating arm has two sections or arms 20 and 21, extending down at each side and substantially parallel with the glass of the wind shield. The lower or swinging end of the arm 21 is turned sharply inward, or toward the other arm, forming a tip 23, upon which one of the cleaner bars is pivotally secured. The other arm 20, the same being the arm which is at the rear side of the wind shield, or toward the driver, is first bent outwardly or away from the other arm and then back to form a handle 24. Its tip 25 extends inwardly from the main body 20 so as to form a pivotal attachment with the other cleaner bar 3.

Each of the cleaner bars consists of a metal plate 3, having its edges 31 bent over and crimped down upon edges of a strip of rubber, or other similar material 32. This strip of rubber is buckled so that its central portion projects away from the metal strip. The purpose of this is two-fold; one purpose is to secure a projecting portion to engage and wipe over the surface of the glass, without the metal frame contacting therewith. The other is to form a socket for the reception of the body of the guide bars 5, whereby the position of the cleaner bars is controlled. These guide bars do not extend the entire length of the cleaner bars, but a material part thereof, enough to give a good supporting connection between the two.

In operating the device, the handle 24 is grasped and the cleaner bar swung from side to side, thus sweeping over an annular segment upon the face of the wind shield. By using two cleaner bars contacting, respectively, with opposite sides of the glass, the cleaning of both sides is assured.

The operating arm has its two sections 20 and 21, bent to such a point that they exert an inward spring action upon the cleaner bars 3, thereby holding them gently, yet securely, against the face of the glass. This also makes it possible to remove one of these cleaner bars, if desired for any purpose, by springing out the arm 20 or 21, as the case may be, with which it is attached.

What I claim as my invention is:

In a wind shield cleaner, in combination, a pivot base provided with means for securing it upon the edge of a wind shield, a flat cleaner bar and a wiper member comprising a plate of yielding material of a width relatively slightly greater than the effective width of the cleaner bar, opposite edges of said cleaner bar being folded over to secure the edges of the plate of yielding material and to cause the latter to buckle outward at the center, a guide rod mounted between said cleaner bar and said plate of yielding material and pivotally connected with the pivot base, and an operating arm pivoted upon said base and upon the cleaner bar.

Signed at Denver, Colorado, this 20th day of November, 1916.

HOWARD D. THOMAS.